United States Patent
Kuwahara

(10) Patent No.: US 7,301,333 B2
(45) Date of Patent: Nov. 27, 2007

(54) ANGLE POSITION DETECTION APPARATUS

(75) Inventor: Masaki Kuwahara, Kanagawa (JP)

(73) Assignees: NSK Ltd., Tokyo (JP); NSK Precision Co., Ltd., Tokyo (JP)

( * ) Notice: Subject to any disclaimer, the term of this patent is extended or adjusted under 35 U.S.C. 154(b) by 45 days.

(21) Appl. No.: 10/793,220

(22) Filed: Mar. 5, 2004

(65) Prior Publication Data

US 2004/0174162 A1  Sep. 9, 2004

(30) Foreign Application Priority Data

Mar. 6, 2003  (JP) .................... P.2003-060538

(51) Int. Cl.
  *G01B 7/30* (2006.01)
(52) U.S. Cl. ............................... 324/207.25
(58) Field of Classification Search ........... 324/207.17, 324/207.25; 310/67 A, 168, 68 B, 112, 166
See application file for complete search history.

(56) References Cited

U.S. PATENT DOCUMENTS

| | | | | |
|---|---|---|---|---|
| 4,572,951 A * | 2/1986 | Toda et al. | ............ | 250/231.18 |
| 4,843,292 A * | 6/1989 | Ono et al. | .................. | 318/606 |
| 5,032,750 A * | 7/1991 | Hayashi | ....................... | 310/83 |
| 5,189,353 A * | 2/1993 | Ezuka | ......................... | 318/605 |
| 5,341,076 A * | 8/1994 | Bahn | .......................... | 318/254 |
| 5,444,368 A * | 8/1995 | Horber | .................. | 324/207.16 |
| 5,689,182 A * | 11/1997 | Togo et al. | ............ | 324/207.15 |
| 5,763,976 A * | 6/1998 | Huard | ........................ | 310/168 |
| 5,925,953 A * | 7/1999 | Shibata | ........................ | 310/83 |
| 6,137,204 A * | 10/2000 | Kuwahara | .................... | 310/254 |
| 6,711,970 B2 * | 3/2004 | Matsuura et al. | ....... | 73/862.328 |
| 6,754,610 B2 * | 6/2004 | Dudler et al. | ................ | 702/151 |
| 6,901,816 B2 * | 6/2005 | Yamaguchi | ............ | 73/862.326 |
| 2003/0090223 A1* | 5/2003 | Nishizawa et al. | ......... | 318/268 |
| 2004/0004471 A1* | 1/2004 | Haas et al. | ............... | 324/207.2 |

FOREIGN PATENT DOCUMENTS

| | | | |
|---|---|---|---|
| JP | 06-046552 A | | 2/1994 |
| JP | 06046552 A | * | 2/1994 |
| JP | 407318368 | * | 12/1995 |
| JP | 2002168652 A | * | 6/2002 |
| JP | 2003-153510 A | | 5/2003 |
| WO | WO 0216864 A1 | * | 2/2002 |

* cited by examiner

*Primary Examiner*—Reena Aurora
*Assistant Examiner*—Kenneth J Whittington
(74) *Attorney, Agent, or Firm*—Sughrue Mion Pllc.

(57) ABSTRACT

An angle position detection apparatus according to the present invention includes: a unipolar resolver and a multipolar resolver installed so that reluctance is changed in synchronization with the revolution of a direct motor drive; and a select switch is used to switch between paths along which an excitation signal from a transmitter is supplied to these resolvers. When the supply path for the excitation signal is changed by the select switch, at the least, the unipolar resolver and the multipolar resolver are not excited at the same time, so that magnetic flux leaking from one resolver does not electrically interfere with the other resolver. Therefore, the unipolar resolver and the multipolar resolver 30 can be arranged so they are near each other, and the size and the thickness of the angle detection apparatus can be reduced.

12 Claims, 9 Drawing Sheets

ANGLE POSITION DETECTION APPARATUS

BACKGROUND OF THE INVENTION

The present invention relates to an angle position detection apparatus that incorporates a plurality of VR resolvers, and relates in particular to an improved technique appropriate for reducing the size and the thickness of a direct drive motor, while providing a high angle position detection accuracy.

Since a direct drive motor for which no speed reducer is provided can drive a load directly and can perform accurate positioning without backlash or lost motion, such a motor can be used for various applications, including an index table for an NC machine tool, a carrier device, or a robot arm for an assembly device. For these reasons, efforts are made to develop a smaller direct drive motor that can provide more accurate positioning. To this end, an improved technique is proposed in JP-A-6-46552 (Patent document 1). According to this technique, a blocking member that magnetic flux can not easily pass is located between a unipolar resolver and a multipolar resolver, which are incorporated in the motor housing of a direct drive motor, so that neither resolver will be affected by magnetic interference produced by the leakage of magnetic flux from the other. With this configuration, accurate positioning is ensured.

[Patent document 1]
JP-A-6-46552

However, when a blocking member is arranged in the gap between the resolvers, the size of the internal space required to install the resolvers in the motor housing is increased, and reducing the size and the thickness of the direct drive motor is difficult. On the other hand, the size and the thickness of the direct drive motor can easily be reduced by removing the blocking member; but if this is done, magnetic flux would leak from the adjacently located resolvers and the detection accuracy would be degraded.

SUMMARY OF THE INVENTION

It is, therefore, one objective of the present invention to provide an improved technique that can reduce the size and thickness of an angle position detection apparatus, while ensuring high accuracy for angle position detection.

To achieve this objective, according to the present invention, an angle position detection apparatus includes:

a plurality of incorporated VR resolvers for changing reluctance in synchronization with-the rotation of a rotary shaft;

a transmitter for outputting an excitation signal;

a switching unit for changing a supply path for the excitation signal so that the excitation signal output by the transmitter is transmitted to one of the alternately selected VR resolvers; and a detector for, based on a signal output by the VR resolver, detecting an angle position for the rotary shaft.

With this configuration, since the supply path for the excitation signal can be changed in order to prevent all the resolvers from being excited at the same time, magnetic flux leaking from one resolver does not magnetically interfere with another resolver. Therefore, the distance between the resolvers can be reduced and minimized, so that the size and the thickness of the angle position detection apparatus can be reduced, and accurate position detection can be performed.

Preferably, the detector includes a single current/voltage transformer for converting into a resolver signal a current signal output by each of the VR resolvers. With this configuration, the current/voltage transformer can be employed in common by a plurality of VR resolvers, and the hardware structure can be simplified.

DETAILED DESCRIPTION OF THE PREFERRED EMBODIMENTS

First Embodiment

A first embodiment of the present invention will now be described while referring to the accompanying drawings.

Figure 3:
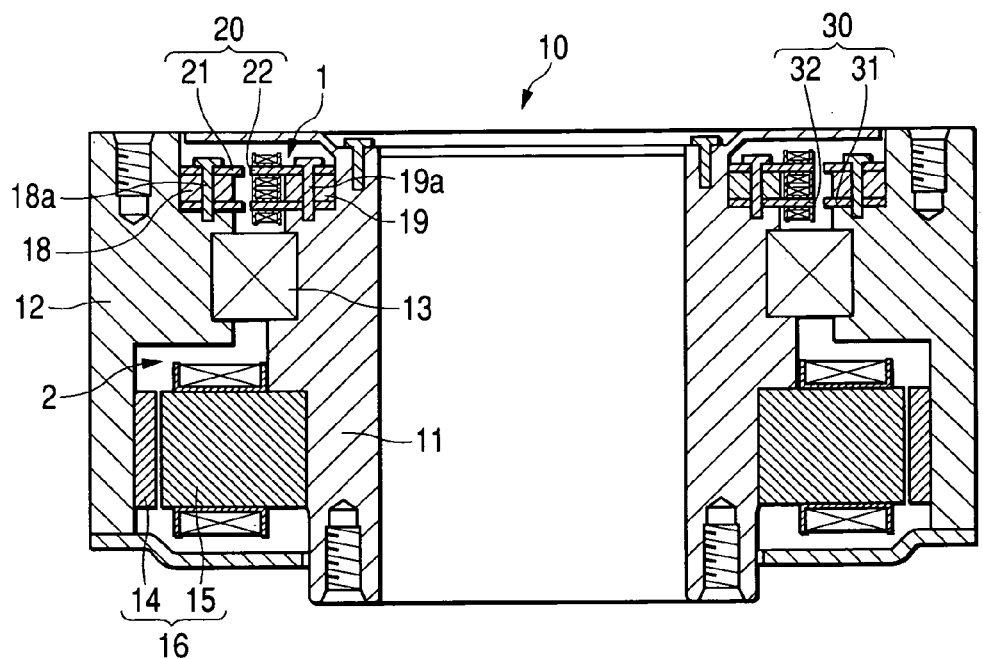
FIG. 3 is a cross-sectional view of a direct drive motor.

FIG. 3 is a cross-sectional view of a direct drive motor according to this embodiment. As is shown in FIG. 3, in a direct drive motor 10, a rotary shaft 12 rotates freely, supported by a bearing 13 that is fixed to the outer side face of an inner housing 11, which has a hollow cylindrical shape. The rotary shaft 12 is provided as a hollow cylindrical body so that the inner housing 11 can be inserted into it.

The internal cylindrical wall of the rotary shaft 12 is raised and recessed so as to define, at a gap with the inner housing 11, an inner space 1 within which a unipolar resolver 20 and a multipolar resolver 30 are contained, and an inner space 2 in which a motor 16 is retained. The inner spaces 1 and 2 are separated by the bearing 13, and are located at a specific distance from it to prevent magnetic flux from leaking from the motor 16 and reaching the inner space 1. When the inner spaces 1 and 2 are arranged so they are closely positioned without the bearing 13 between the spaces 1 and 2, it is preferable that a blocking member be so arranged that it prevents magnetic flux from leaking from the motor 16 and reaching the inner space 1.

The motor 16 is a PM motor of an outer rotor type that includes a rotor 14 and a stator 15. The rotor 14 is a permanent magnet for which N poles and S poles are alternately fixed to the inner wall of the rotary shaft 12 in the circumferential direction. The stator 15 is a motor core including a plurality of laminated thin steel sheets, and is fixed to the outer wall of the inner housing 11 so that it faces the rotor 14 across a tiny air gap. In this embodiment, the PM motor of an outer rotor type is employed as the motor 16; however, a PM motor of an inner rotor type may be employed, or various other motors may also be employed. For example, the rotor 14 may be formed by laminating thin steel sheets, instead of using a permanent magnet, and may include a predetermined number of polar teeth that project inward or outward.

The unipolar resolver 20 includes a ring shaped resolver rotor 21 that is fixed to the inner wall of the rotary shaft 12, and a resolver stator 22 that is fixed to the outer wall of the inner housing 11 so that it faces the resolver rotor 21. Likewise, the multipolar resolver 30 includes a ring shaped resolver rotor 31 that is fixed to the inner wall of the rotary shaft 12, and a resolver stator 32 that is fixed to the outer wall of the inner housing 11 so that it faces the resolver rotor 31.

The unipolar resolver 20 and the multipolar resolver 30 are secured in the inner space 1, with a tiny intervening gap, to provide a vertical, double layered structure through an inter-rotor seat 18 and an inter-stator seat 19. That is, the inter-rotor seat 18 is located between the resolver rotors 21 and 31, which are fixed to the inner wall of the rotary shaft 12 by a plurality of bolts 18a, while the inter-stator seat 19 is located between the resolvers 22 and 32, which are fixed to the outer wall of the inner housing 11 by a plurality of bolts 19a.

It is preferable that a nonmagnetic material be employed to form the inner housing 11 and the rotary shaft 12 that define the inner space 1, and the inter-rotor seat 18 and the inter-stator seat 19 that are mounted in the inner space 1. When these members defining the inner space 1 are made of a nonmagnetic material, the magnetic flux that leaks from the motor 16 can be prevented from reaching the inner space 1.

Figure 8:
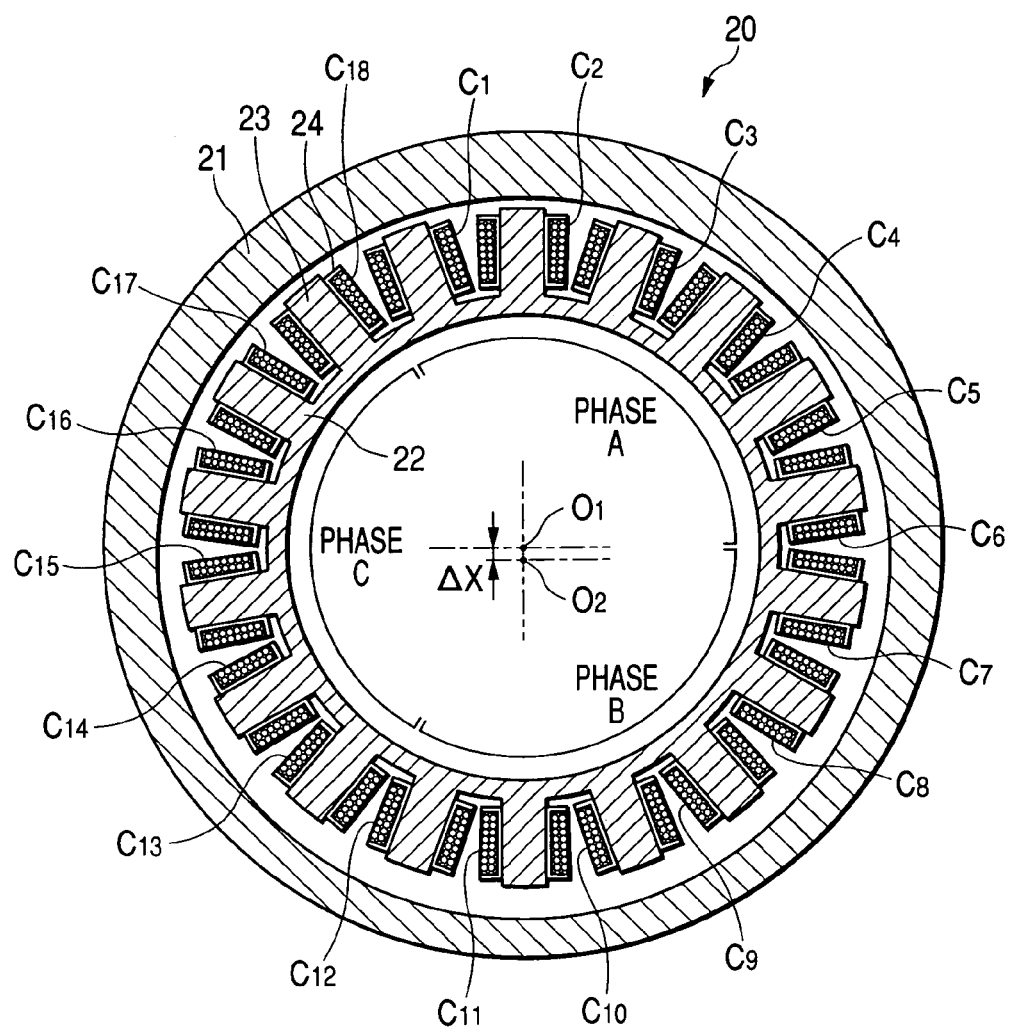
FIG. 8 is a plan view of the unipolar resolver.

FIG. 8 is a plan view of the unipolar resolver 20. As is shown in FIG. 8, the unipolar resolver 20 is a three-phase VR resolver wherein the reluctance at the gap between the resolver rotor 21 and the resolver stator 22 is changed in accordance with the rotation angle position of the resolver rotor 21, and wherein the fundamental wave element of the reluctance change constitutes one cycle in accordance with one revolution of the resolver rotor 21. That is, the thickness of the resolver rotor 21 in the direction of the diameter is sequentially changed, so that the centers of the outer diameter and the inner diameter of the resolver stator 22 and the center of the outer diameter of the resolver rotor 21 correspond to the rotational center $O_1$ of the direct drive motor, while the eccentric center $O_2$ of the inner diameter of the resolver rotor 21 is offset a distance $\Delta x$ from the rotational center $O_1$.

A total of 18 status poles 23, which provide a phase A, a phase B and a phase C at an interval of 120, project outward at the same intervals at the outer wall of the resolver stator 22, and coil bobbins 24, around which stator coils $C_1$ to $C_{18}$ are wound, are attached to the individual stator poles 23. For the coil bobbins 24, any nonmagnetic material can be employed so long as it is appropriately flexible, and the use of a thermoplastic resin, such as styrene resin, a polycarbonate resin, a polyphenylene resin, nylon, or a polybutylene terephthalate resin, makes injection molding easy.

When an excitation signal is applied to a common terminal for the stator coils $C_1$ to $C_{18}$, during one revolution of the resolver rotor 21, current signals having phases that are shifted 120° are output by the stator coils $C_1$ to $C_{18}$ in phase A, phase B and phase C. Then, a unipolar resolver signal output by the unipolar resolver 20 can be employed to detect an absolute rotation angle position.

Figure 5:
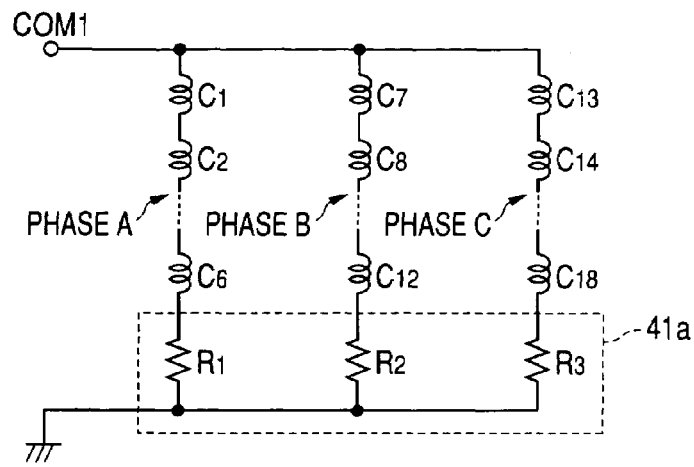
FIG. 5 is a diagram showing the connection of stator coils for a unipolar resolver.

FIG. 5 is a diagram showing the connection of the status coils $C_1$ to $C_{18}$ that are wound around the stator poles 23 of the unipolar resolver 20. When an excitation signal is applied to a common terminal COM1, current signals flowing across the stator coils $C_1$ to $C_6$, $C_7$ to $C_{12}$ and $C_{13}$ to $C_{18}$, which form phase A, phase B and phase C, are converted into voltage signals by a current/voltage transformer 41a that includes detection resistors $R_1$, $R_2$ and $R_3$. Subsequently, the voltage signals are transmitted as unipolar resolver signals (ABS signals) to a 3/2 phase converter 42a, which will be described later.

Figure 9:
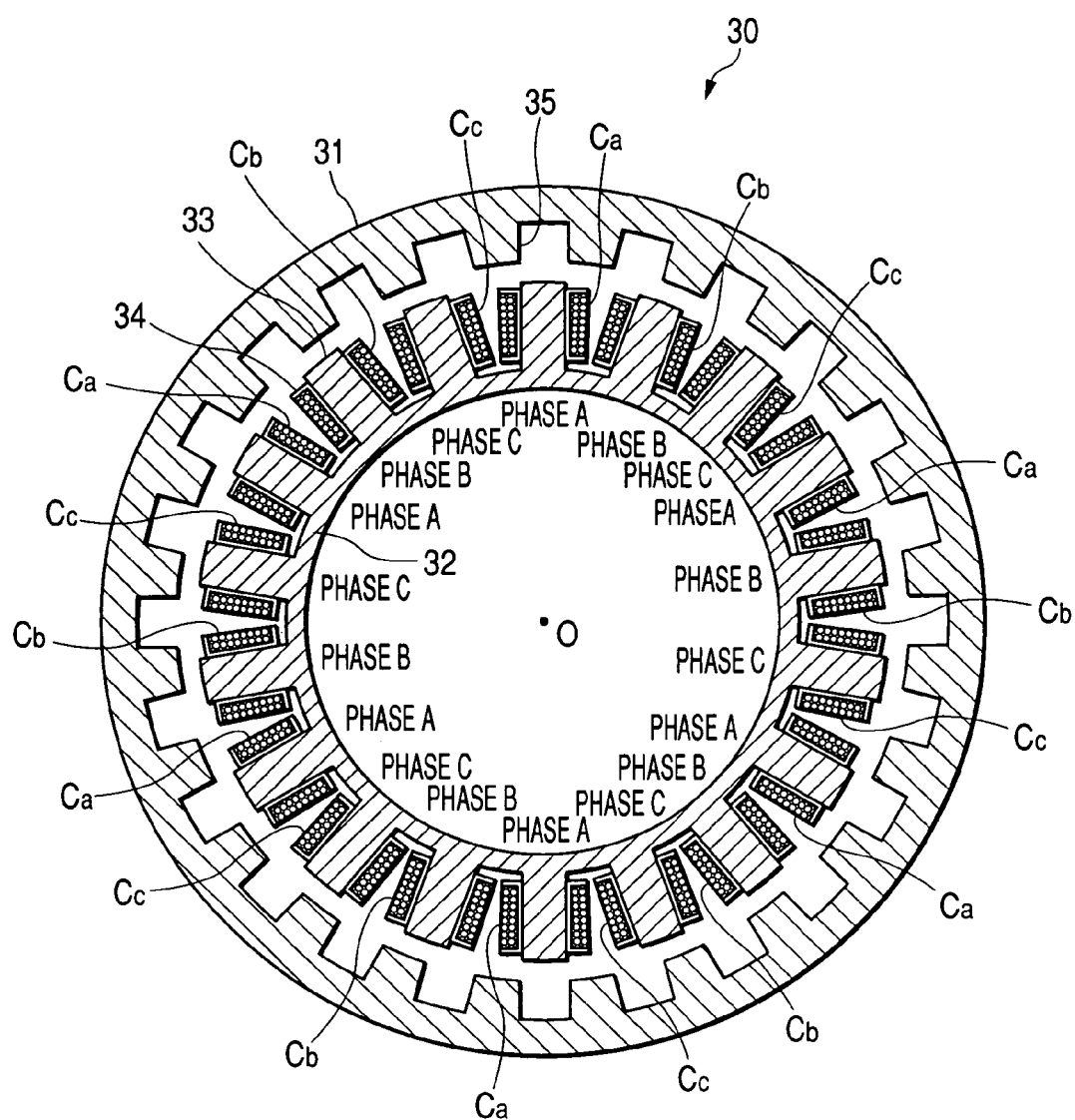
FIG. 9 is a plan view of the multipolar resolver.

FIG. 9 is a plan view of the multipolar resolver 30. As is shown in FIG. 9, the center O of the inner diameter of the resolver rotor 31 matches the center O of the inner diameter of the resolver stator 32; the reluctance at the gap between the resolver rotor 31 and the resolver stator 32 is changed in accordance with the rotation angle position of the resolver rotor 31; and the fundamental wave element of the reluctance change forms a plurality of cycles in consonance with a revolution of the resolver rotator 31. A total of 24 polar teeth 35, which are formed on the inner wall of the resolver rotor 31, project inward at the same interval in the direction of the diameter. Further, a total of 18 stator poles 33 are arranged at the same interval on the outer wall of the resolver stator 32 and project outward in the direction of the diameter, so that phases A, B and C are shifted at an electrical angle of 120°.

Coil bobbins, around which stator coils $C_A$ to $C_C$ are wound, are attached in advance to the individual stator poles 33. Then, when an excitation signal is applied to a common line for the stator coils $C_A$ to $C_C$, during one revolution of the resolver rotor 31, a 24 cycle alternating current signal is output for each phase. By using a multipolar resolver signal output by the multipolar resolver 30, a relative rotation angle position can be detected.

Figure 6:
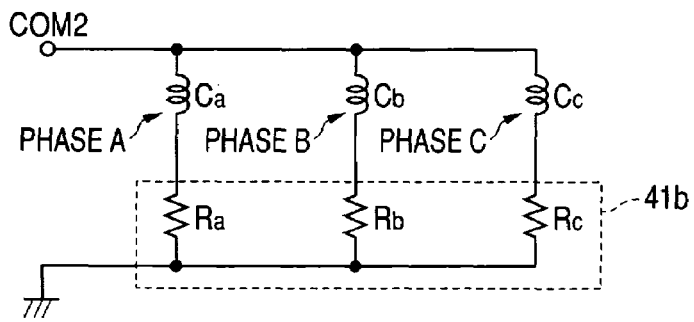
FIG. 6 is a diagram showing the connection of stator coils for a multipolar resolver.

FIG. 6 is a diagram showing the connections of the stator coils $C_A$ to $C_C$ wound around the stator poles 33 of the multipolar resolver 30. When an excitation signal is applied to a common terminal COM2, resolver signals traveling across the stator coils $C_a$, $C_b$ and $C_c$ that form phase A, phase B and phase C are converted into voltage signals by a current/voltage transformer 41b that includes detection resistors $R_a$, $R_b$ and $R_c$. Thereafter, the voltage signals are transmitted as multipolar resolver signals (INC signals) to a 3/2 phase converter 42b, which will be described later.

The number of stator poles 33 need only be a multiple of the number of phases (three in this embodiment), and is not limited to 18. Furthermore, although in this embodiment, 24 polar teeth 35 are formed, the number of the polar teeth 35 is not limited to 24. In addition, when the polar teeth 35 are electrically divided into more segments, a further increase in the resolution of the multipolar resolver 30 can be realized. In the explanation for this embodiment, the stator poles of the unipolar resolver 20 and the multipolar resolver 30 are outwardly projecting teeth, and the resolver rotors are provided outside the resolver stators. However, the stator poles may be formed as inwardly projecting teeth, and the resolver rotors may be provided inside the resolver stators. Further, the number of phases of the resolver signal is not limited to a three-phase resolver signal, and either a two-phase resolver signal, a four-phase resolver signal, or a six-phase resolver signal may be employed.

Figure 1:
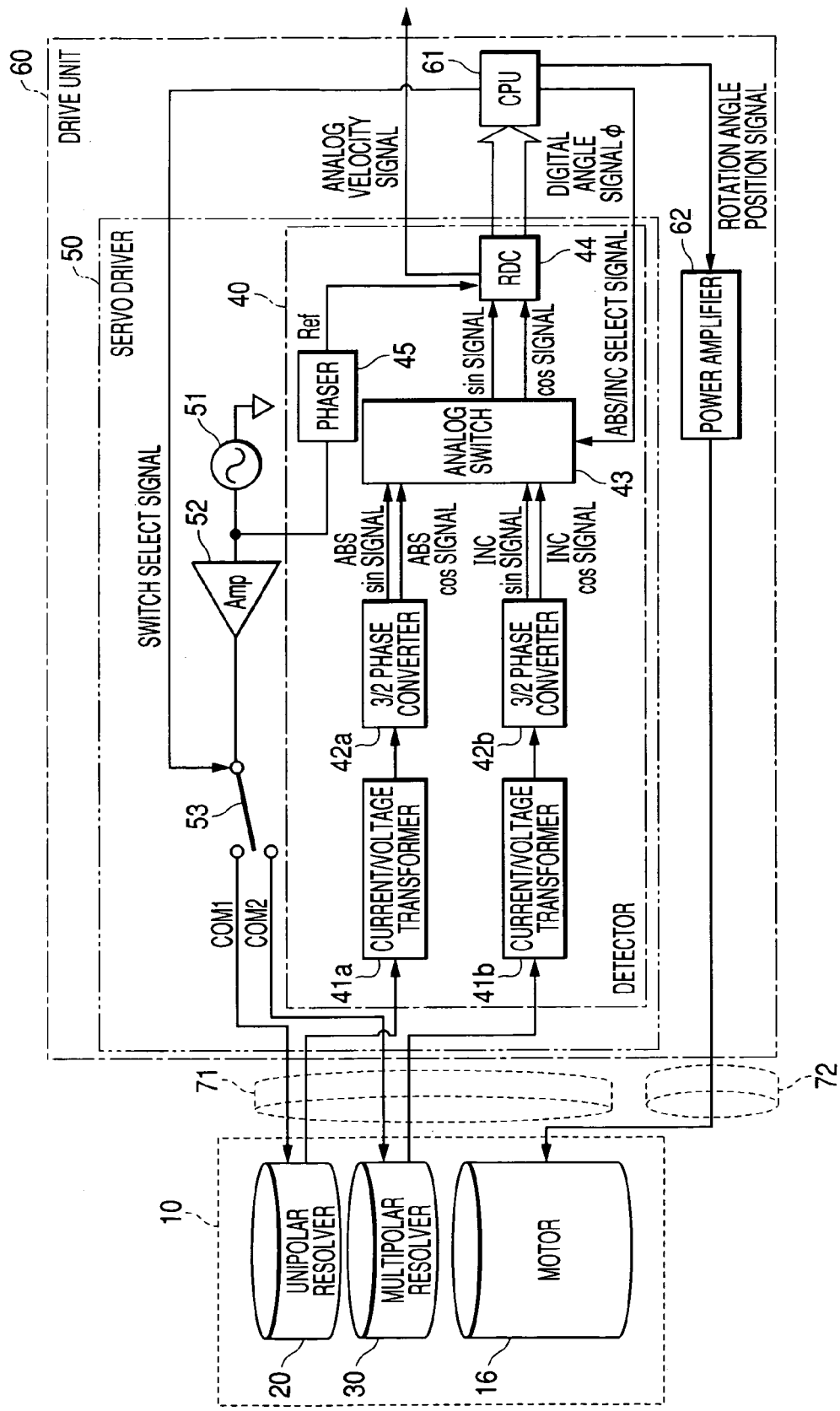
FIG. 1 is a block diagram showing the configuration of an angle detection apparatus according to a first embodiment of the present invention.

FIG. 1 is a block diagram showing the configuration, including an angle position detection apparatus, according to the first embodiment. The angle position detection apparatus includes: the unipolar resolver 20 and the multipolar resolver 30, which are incorporated in the direct drive motor 10; and part of a drive unit 60 that controls these components. The drive unit 60 includes: a servo driver 50, for supplying an excitation signal to either the unipolar resolver 20 or the multipolar resolver 30 and receiving a resolver signal therefrom, and for outputting a digital angle signal φ; and a CPU 61, for employing the digital angle signal φ to generate an rotation angle position signal and for supplying power, through a power amplifier 62, to the direct drive motor 10. The drive unit 60 is connected to the unipolar resolver 20 and the multipolar resolver 30 by a resolver cable 71, and is also connected to the motor 16 by a motor cable 72.

In the servo driver 50, an excitation signal output by a transmitter 51 is amplified to an appropriate signal level by an amplifier 52; and the common terminal COM1, for the unipolar resolver 20, and the common terminal COM2, for the multipolar resolver 30, are selected through a select switch 53, so that the amplified signal is transmitted along the selected supply path. The select switch 53 is switching means that is located along an excitation signal supply path extending from the transmitter 51 to the unipolar resolver 20 and the multipolar resolver 30, and is used to change the path for supplying the excitation signal to either resolver. The select switch 53, for selecting the common terminal COM1 or COM2, is controlled by a switch change signal output by the CPU 61.

Immediately after the system is powered on and activated, the CPU 61 changes the select switch 53 to select the common terminal COM1 to supply an excitation signal to the unipolar resolver 20. A current signal output by the unipolar resolver 20 is converted into an ABS signal by the current/voltage transformer 41a, and the ABS signal is converted into a two-phase signal (a sin signal and a cos signal) by the 3/2 phase converter 42a and the two-phase signal is transmitted to an analog switch 43.

When the transmission angular frequency for the transmitter 51 is denoted by ω and a higher element is ignored, the resolver signals for individual phases obtained by the current/voltage converter 41a are represented by the following equations (1) to (3). In this embodiment, for the sake of convenience, phase A is employed as a reference and phases B and C are delayed 120 degrees relative to phase A. Further, the two-phase signal output by the 3/2 phase converter 42a is represented by (4) and (5). In equation. (5), sqr(x) is defined as a function for returning the square root of argument x.

$$\phi A = (A_1 + A_2 \sin\theta) \cdot \sin\omega t \qquad (1)$$

$$\phi B = \{B_1 + B_2 \sin(\theta - 2\Pi/3)\} \cdot \sin\omega t \qquad (2)$$

$$\phi C = \{C_1 + C_2 \sin(\theta - 4\Pi/3)\} \cdot \sin\omega t \qquad (3)$$

$$\sin\text{ signal} = \phi A - (\phi B + \phi C)/2 \qquad (4)$$

$$\cos\text{ signal} = sqr(3/4) \cdot (\phi B - \phi C) \qquad (5)$$

On the other hand, based on the ABS signal, the CPU 61 obtains the value of the digital angle signal φ (abs that will be described later), the CPU 61 changes the select switch 53 to the common terminal COM2, and supplies an excitation signal to the multipolar resolver 30. A current signal output by the multipolar resolver 30 is converted into an INC signal by the current/voltage converter 41b, and the INC signal is converted into a two-phase signal (a sin signal and a cos signal) by the 3/2 phase converter 42b and the two-phase signal is transmitted to an analog switch 43.

The analog switch 43 is a switch element controlled in accordance with an ABS/INC select signal output by the CPU. 61. With the analog switch 43, the two-phase ABS signal or the two-phase INC signal is selectively passed through and transmitted to an RDC (resolver digital converter) 44. It should be noted that an ABS/INC select signal is output by the CPU 61 so that the timing that a signal passing through the analog switch 43 is changed from the two-phase ABS signal to the two-phase INC signal is substantially synchronized with the timing at which the connection destination of the select switch 53 is changed from COM1 to COM2.

A phaser 45 delays the phase of an excitation signal output by the transmitter 51, and transmits, to the RDC 44, a Ref signal that is synchronized with the phase of a carrier signal, which is either the sin signal or the cos signal of the two-phase ABS or INC signal. The RDC 44 digitizes the two-phase signal received from the analog switch 43, and outputs a digital angle signal φ to the CPU 61. The RDC 44 also outputs an analog velocity signal that is synchronously rectified in accordance with the transmission angular frequency of the transmitter 51.

Figure 7:
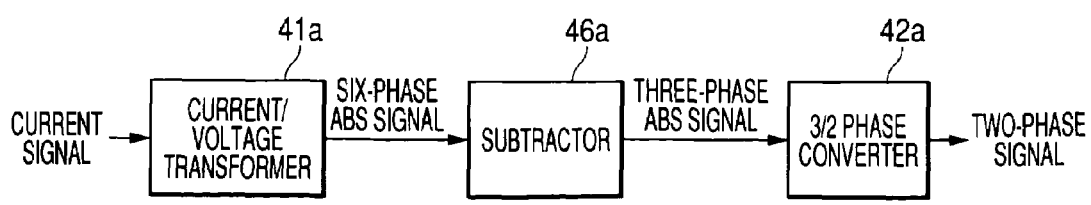
FIG. 7 is a diagram showing a part of a hardware configuration for a detector.

In this explanation, a three-phase resolver is employed as the unipolar resolver 20. However, the present invention is not thereby limited, and a six-phase resolver may be employed as the unipolar resolver 20. When a six-phase resolver is employed, resolver signals represented by the following equations (6) to (11) are employed instead of those represented by equations (1) to (3). Therefore, as is shown in FIG. 7, a subtractor 46a need merely be arranged between the current/voltage transformer 41a and the 3/2 phase converter 42a. The subtractor 46a calculates differences dA, dB and dC between resolver signals of the individual phases, and converts the six-phase resolver signal into a three-phase resolver signal represented by equations (12) to (14). The three-phase resolver signal represented by equations (12) to (14) is then converted into a two-phase signal by the 3/2 phase converter 42a.

$$\phi A += (A_1 + A_2 \sin\theta) \cdot \sin\omega t \qquad (6)$$

$$\phi A -= (A_1 + A_2 \sin(\theta - \Pi)) \cdot \sin\omega t \qquad (7)$$

$$\phi B += \{B_1 + B_2 \sin(\theta - 2\Pi/3)\} \cdot \sin\omega t \qquad (8)$$

$$\phi B -= \{B_1 + B_2 \sin(\theta - 2\Pi/3 - \Pi)\} \cdot \sin\omega t \qquad (9)$$

$$\phi C += \{C_1 + C_2 \sin(\theta - 4\Pi/3)\} \cdot \sin\omega t \qquad (10)$$

$$\phi C -= \{C_1 + C_2 \sin(\theta - 4\Pi/3 - \Pi)\} \cdot \sin\omega t \qquad (11)$$

$$dA = 2A_2 \sin\theta \cdot \sin\omega t \qquad (12)$$

$$dB = 2B_2 \sin(\theta - 2\Pi/3) \cdot \sin\omega t \qquad (13)$$

$$dC = 2C_2 \sin(\theta - 4\Pi/3) \cdot \sin\omega t \qquad (14)$$

Furthermore, when another type of resolver, such as a two-phase resolver or a four-phase resolver, is employed, the structure of a detector 40 need merely be changed so it is consonant with the resolver type employed.

Figure 4A:
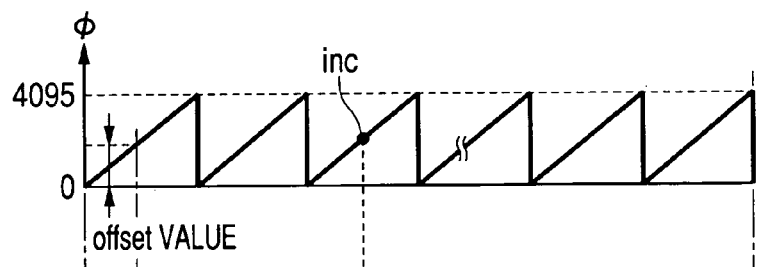
FIGS. 4A and 4B are graph showing resolver signals obtained by digital conversion.
Figure 4B:
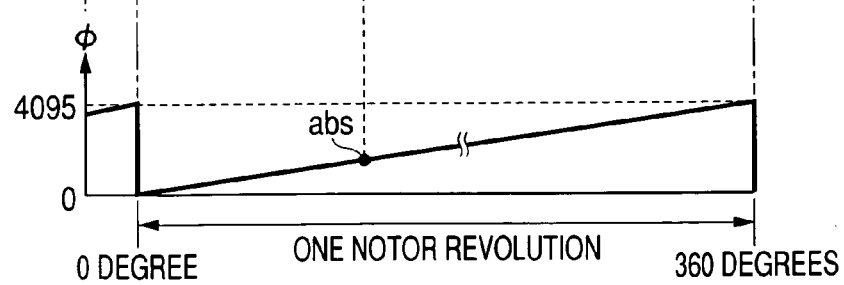

FIGS. 4A and 4B are graph showing a digital resolver signal obtained by conversion. When a converter for a 12 bit specification is employed as the RDC 44, as is shown in FIGS. 4A and 4B, a two-phase ABS signal B is converted into a digital angle signal φ having has 4096 ($=2^{12}$) pulses for each revolution of the resolver rotor. That is, when the unipolar resolver 20 is rotated once, the ABS signal becomes a digital value obtained by counting from one to 4095. On the other hand, as is shown in FIGS. 4A and 4B, a two-phase INC signal A is converted into a digital angle signal φ that has 4096×24 (the total number of the polar teeth 35)=98304 pulses for each revolution of the resolver rotor. That is, the INC signal becomes a digital value by repetitiously counting 24 times, from 0 to 4095, while the multipolar resolver 30 is rotated once.

In FIGS. 4A and 4B, an offset value is a value representing a difference for one of the fundamental wave elements during a 24 cycle INC signal sequence when a rotational angle of 0 degrees, which corresponds to the starting point for the fundamental wave element of the ABS signal, is employed as a reference.

The CPU 61 fetches these digital angle signals φ, and calculates the rotation angle position of the direct drive motor 10. When abs denotes the value of the digital angle signal φ obtained by the RDC 44 through the conversion of the two-phase ABS signal, and inc denotes the value of the digital angle signal φ obtained by the RDC 44 through the conversion of the two-phase INC signal, the rotation angle position can be acquired by performing the calculation abs×24+(2048−inc)+the offset value. Based on the rotation angle position, the CPU 61 supplies power through the power amplifier 62 to the direct drive motor 10.

In order to obtain the digital angle signal φ that is based on the resolver signal, the hardware (the 3/2 phase converter and the RDC) need not be employed for the processing, and the A/D conversion that may be performed for the resolver signal and the information processing using software may be performed to obtain the digital angle signal φ.

Figure 2:
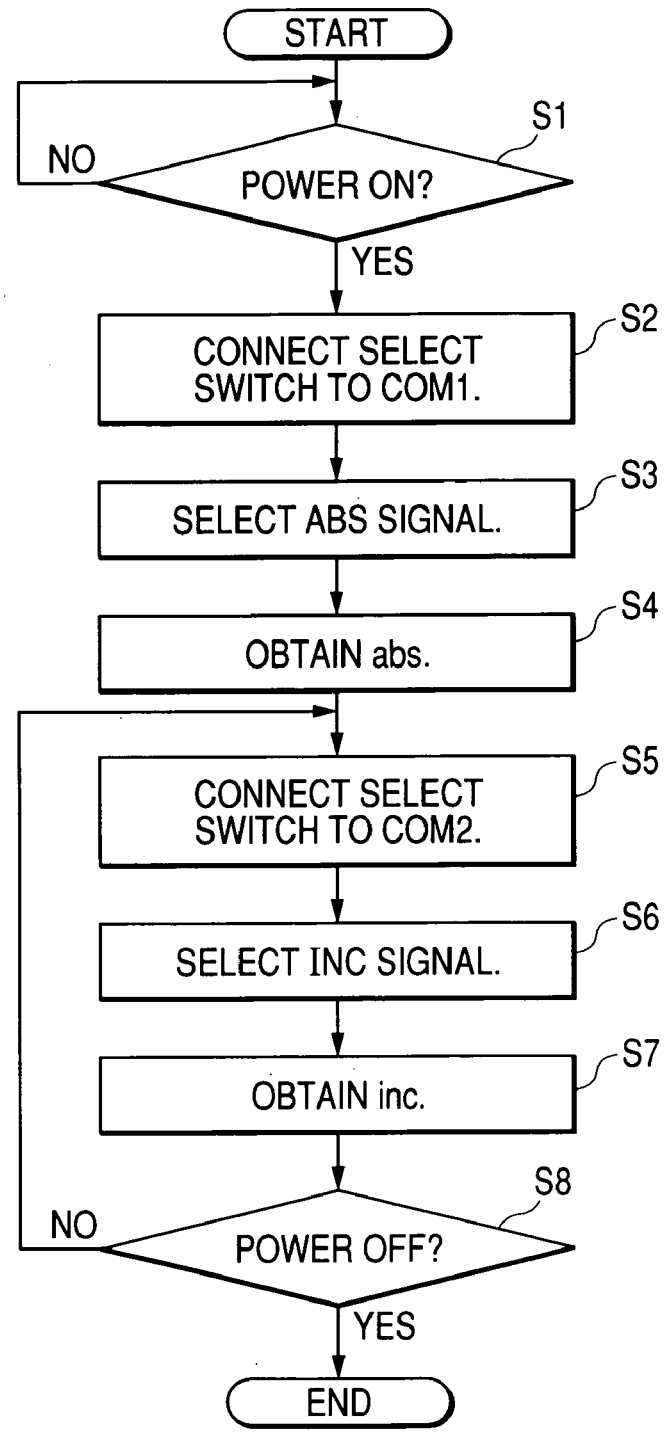
FIG. 2 is a flowchart showing the angle position detection processing routine.

FIG. 2 is a flowchart showing the position detection processing routine performed by the CPU 61. While referring to FIG. 2, the explanation given above will again be given mainly for the control processing of the CPU 61. When the CPU 61 detects power is on while the system is halted (YES at step S1), the CPU 61 outputs a switch select signal to connect the select switch 53 to the common terminal COM1 (step S2). Then, an excitation signal output by the transmitter 51 is transmitted through the common terminal COM1 to the unipolar resolver 20, and a reluctance change that is consonant with the rotation angle position is transmitted as a current signal to the detector 40.

In the detector 40, the current/voltage transformer 41a changes the current signal into a voltage signal, and the 3/2 phase converter 42a changes the voltage signal into a two-phase signal and transmits the two-phase signal to the analog switch 43. The CPU 61 then outputs an ABS/INC select signal to select the two-phase signal as the signal that should be passed through the analog switch 43 (step S3).

The two-phase ABS signal is passed through the analog switch 43 and is converted into a digital signal by the RDC 44, and the digital signal is transmitted as a digital angle signal φ to the CPU 61. The CPU 61 obtains the value of the digital angle signal φ as abs (step S4).

Following this, the CPU 61 outputs a switch select signal to connect the select switch 53 to the common terminal COM2 (step S5). Then, an excitation signal output by the transmitter 51 is transmitted through the common terminal COM2 to the multipolar resolver 30, and a reluctance change that is consonant with the rotation angle position is transmitted as a current signal to the detector 40.

In the detector 40, the current/voltage transformer 41b changes the current signal into a voltage signal, and the 3/2 phase converter 42b changes the voltage signal into a two-phase signal and transmits the two-phase signal to the analog switch 43. The CPU 61 outputs an ABS/INC select signal to select the two-phase INC signal as the signal that should be passed through the analog switch 43 (step S6).

The two-phase INC signal is passed through the analog switch 43 and is converted into a digital signal by the RDC 44, and the digital signal is transmitted as a digital angle signal φ to the CPU 61. The CPU 61 obtains the value of the digital angle signal φ as inc (step S7).

Until the power is turned off, the CPU 61 maintains the connection of the select switch 53 to the common terminal COM2, and permits the two-phase INC signal to be passed through the analog switch 43. (NO at step S8). When the CPU 61 detects the power is off (YES at step S8), this routine is terminated.

As is described above, according to this embodiment, an excitation signal is transmitted only to either the unipolar resolver 20 or the multipolar resolver 30 to prevent both resolvers 20 and 30 from being excited at the same time. Therefore, magnetic flux leaking from one resolver does not electrically interfere with the other resolver. With this configuration, accurate position detection is enabled, and the distance between the unipolar resolver 20 and the multipolar resolver 30 can be reduced to the limit, i.e., to a distance whereat the stator coils $C_1$ to $C_{18}$ of the unipolar resolver 20 almost contact the stator coils $C_A$ to $C_C$ of the multipolar resolvers 30. As a result, the size and the thickness of the direct drive motor 10 can be reduced. The configuration of this embodiment is appropriate for a small direct drive motor that is employed for an index table for an NC machining tool, a carrier device, or the robot arm of an assembly device, and that can perform accurate positioning. Furthermore, since a blocking member is not required, the distance between the unipolar resolver 20 and the multipolar resolver 30 can be shortened, and since a smaller number of parts is required, the manufacturing costs can be reduced.

Further, in this embodiment, since an excitation signal is transmitted only to one of the resolvers, either the unipolar resolver 20 or the multipolar resolver 30, the power consumed can be reduced to half that required by the conventional configuration, wherein an excitation signal is transmitted to both resolvers. In addition, since in the resolver cable 71 there is no crosstalk between the current signals output by the unipolar resolver 20 and the multipolar resolver 30, the position detection accuracy can be increased.

In the explanation given for the embodiment, the unipolar resolver 20 and the multipolar resolver 30 are employed as resolvers installed in the direct drive motor 10. However, this invention is not thereby limited, and can also be applied for a configuration wherein arbitrary resolvers of different types are installed in the direct drive motor 10. Example configurations wherein two types of multipolar resolvers are employed will now be described.

EXAMPLE 1

This example configuration is a type wherein a function for detecting the rotor position of a PM motor is installed. A first resolver is a resolver that includes the same number (e.g.,20) of polar teeth as that of the PM motor, and a second resolver is a high resolution position detection resolver (e.g., 120 teeth). When power is on, first, the digital angle signal of the first resolver is read and the first resolver is changed to the second resolver, and then the digital angle signal of the second resolver is read, so that the phase difference of the PM motor can be employed to detect the rotational position of the rotor. Thereafter, not only the rotational angle position but also the excitation timing for the PM motor can be identified based on the signal output by the second resolver. That is, since the first resolver serves as a UVW sensor (e.g., a Hall device), the UVW sensor is not required.

EXAMPLE 2

This example configuration is a type for detecting the absolute angle position of the rotary shaft 12. A first resolver is an (N+1) polar resolver, and a second resolver is an N-polar resolver (N is an integer of two or greater). Since the difference in the poles between the first resolver and the second resolver is one, the difference between digital angle signals $\phi_1$ and $\phi_2$ of the two resolvers can be employed to detect the absolute angle position of the rotary shaft 12. As for the switching timing for the excitation of these resolvers, when the system is powered on, it is preferable that the first resolver be excited to read the digital angle signal $\phi\square$, and that then the second resolver be excited. When the excitation state of the second resolver is maintained until the system is powered off, the digital angle signal $\phi_1$ read when the system is activated and the digital angle signal $\phi_2$ thereafter detected by the second resolver can be employed to detect the absolute angle position of the rotary shaft 12.

EXAMPLE 3

This example configuration is a type for detecting the absolute angle position of the rotary shaft 12 within a predetermined angle range. In order to detect the absolute angle position within an angle range of 360 degrees/M, a first resolver is an M-pole resolver and a second resolver is a resolver (e.g., 120 polar teeth) having a high-resolution (M is an integer of two or greater). When the multipolar resolvers are employed in this manner, this configuration is appropriate for an example case wherein the robot arm is pivoted within a predetermined angle range, such as 180 degrees, 120 degrees or 90 degrees. The rotor shape of the first resolver is not especially limited so long as the gap between the resolver rotor and the resolver stator is cyclically changed, and various shapes can be employed. To manufacture the first resolver having two polar teeth, various shapes, such as elliptic shapes, gourd shapes and tooth shapes, can be employed for the resolver rotor.

Second Embodiment

Figure 10:
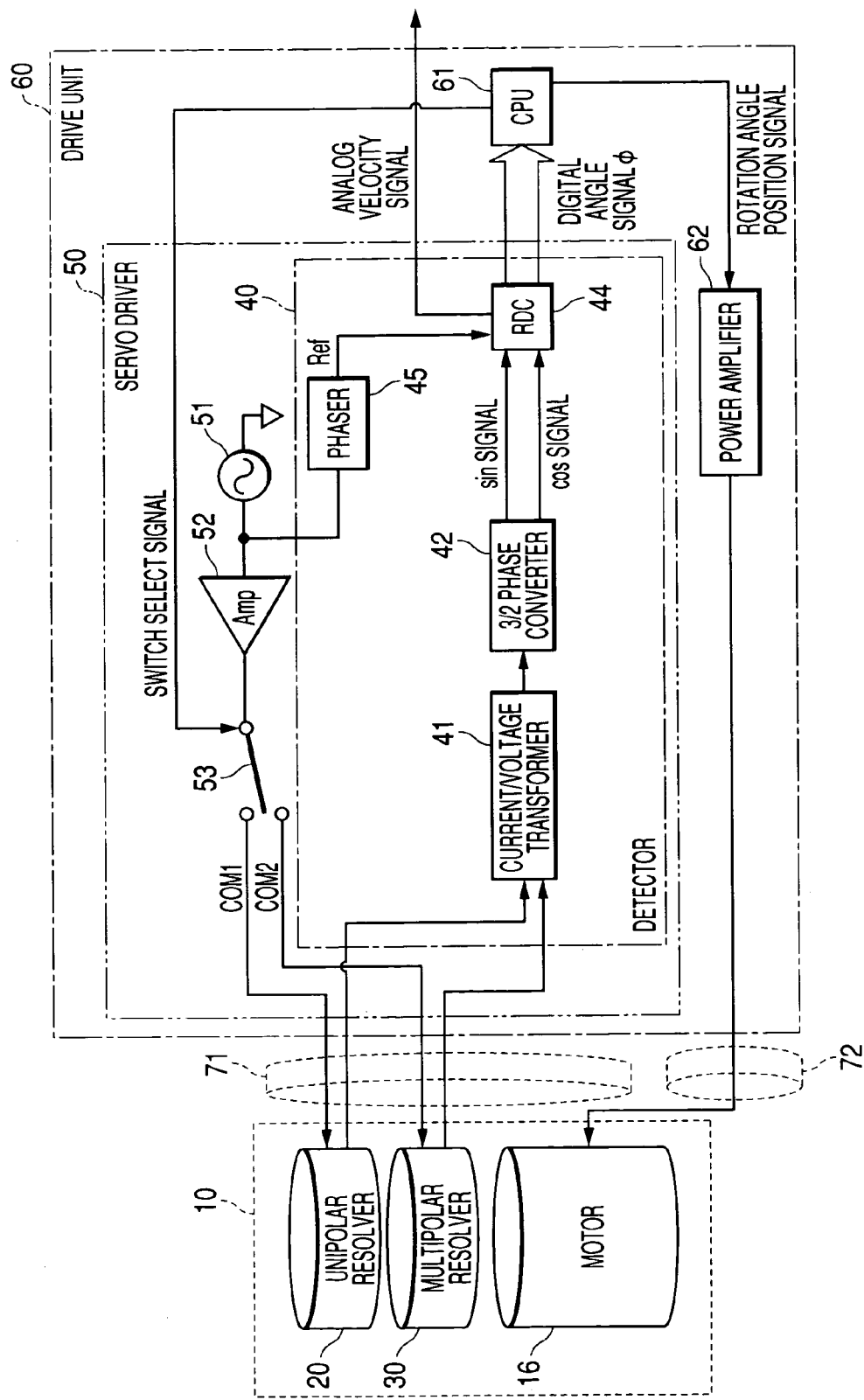
FIG. 10 is a block diagram showing the configuration of an angle position detection apparatus according to a second embodiment of the invention.

FIG. 10 is a block diagram showing the configuration of an angle position detection apparatus according to a second embodiment of the present invention. Since the basic configuration is the same as that for the first embodiment, blocks denoted by the same reference numerals as are used in FIG. 1 are assumed to be corresponding components, and for them, no further detailed explanation will be given. When there is a considerable difference in the output current level between a unipolar resolver 20 and a multipolar resolver 30, in order to correctly detect an ABS signal and an INC signal, special components required for signal conversion, e.g., current/voltage transformers 41a and 41b and 3/2 phase converters 42a and 42b, as in the first embodiment, must be provided for the individual resolvers 20 and 30, and an analog switch 43 is also required. When the output current level is substantially equal between the unipolar resolver 20 and the multipolar resolver 30, the current/voltage transformer 41a or 41b and the 3/2 phase converter 42a or 42b are employed in common by the two resolvers, and the analog switch 43 is not required.

As is shown in FIG. 10, although a detector 40 includes not only the current/voltage converter 41 and the 3/2 phase converter 42, but also an RDC 44 and a phaser 45, as in the first embodiment, its hardware structure is remarkably simplified compared with that in the first embodiment. Current signals output by the unipolar resolver 20 and the multipolar resolver 30 are converted by the current/voltage transformer 41 into ABS signals or INC signals, and these signals are then converted into two-phase signals by the 3/2 phase converter 42. Since the excitation signal is selectively transmitted through the select switch 53 to the unipolar resolver 20 or the multipolar resolver 30, the two resolvers 20 and 30 are not excited at the same time. With this configuration, the current signal can be transmitted from either one of the resolvers to the current/voltage transformer 41, and common use of the current/voltage transformer 41 can be provided.

In this embodiment, various combinations (including examples 1 to 3) of two types of multipolar resolvers can also be employed. Furthermore, the resolvers are not limited to three-phase resolvers, and various other types, such as two-phase resolvers, four-phase resolvers and six-phase resolvers can be employed.

Third Embodiment

Figure 11:
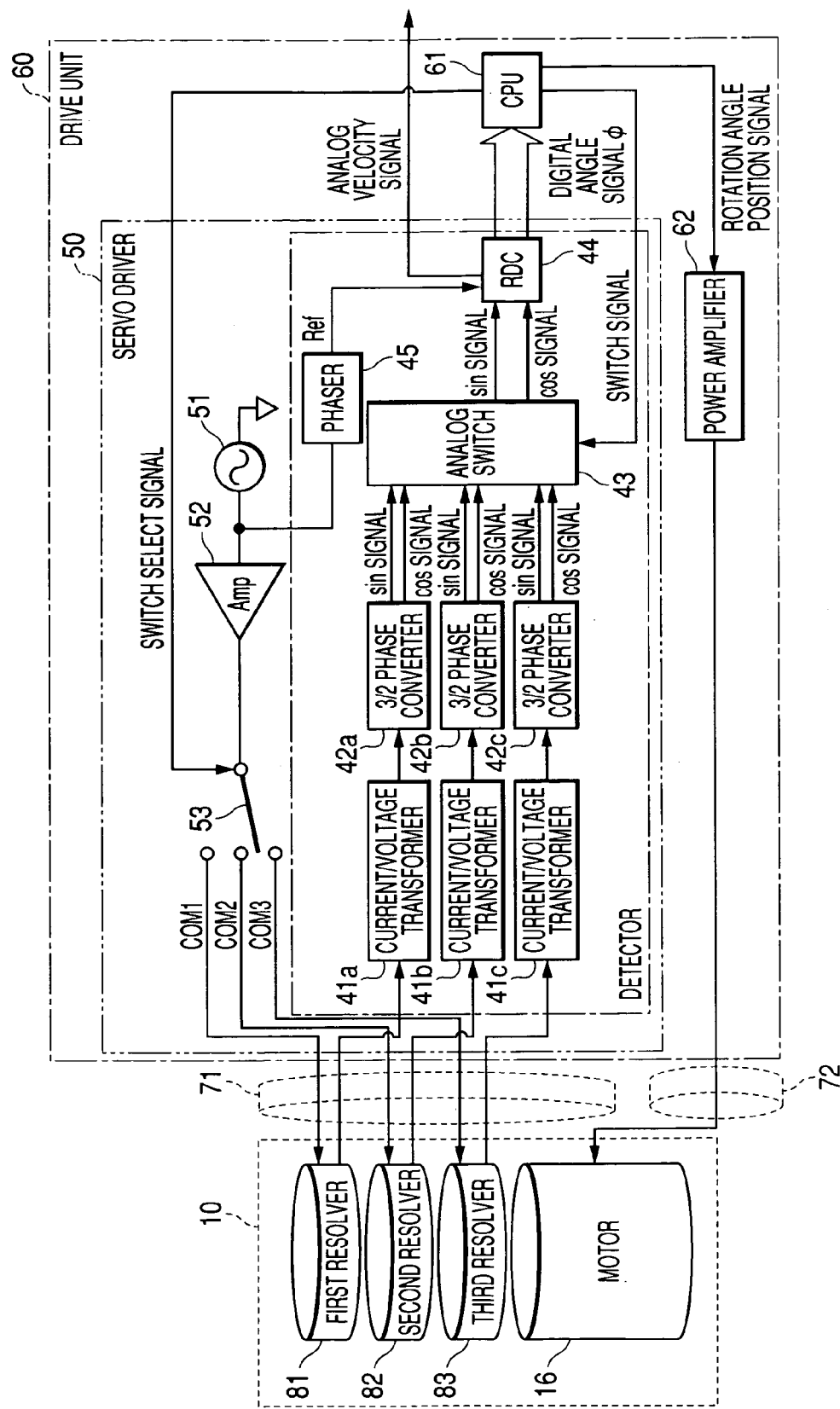
FIG. 11 is a block diagram showing the configuration of an angle position detection apparatus according to a third embodiment of the invention.

FIG. 11 is a block diagram showing the configuration of an angle position detection apparatus according to a third embodiment of the present invention. Since the basic configuration is the same as that for the first embodiment, blocks denoted by the same reference numerals as those used in FIG. 1 are assumed to be corresponding blocks, and for them, no further detailed explanation will be given. In this embodiment, instead of the unipolar resolver 20 and the multipolar resolver 30, a plurality of resolvers are installed in a direct drive motor 10. In this embodiment, three resolvers 81 to 83 are mounted on a rotary shaft 12 of the direct drive motor 10, and an excitation signal is transmitted by changing a select switch 53 to prevent the excitation signal from being transmitted to two or more resolvers.

As is shown in FIG. 11, a detector 40 includes current/voltage transformers 41a to 41c, 3/2 phase converters 42a to 42c, an analog switch 43, an RDC 44 and a phaser 45. The select switch 53 is changed by a CPU 61 to alternately select the first, the second or the third resolver 81, 82 or 83, and an excitation signal is distributed to a common terminal COM1, COM2 or COM3 of the selected resolver. Current signals output by the resolvers 81 to 83 are converted into resolver signals by current/voltage transformers 41a to 41c, and the resolver signals are converted into two-phase signals by 3/2 phase converters 42a to 42c. By employing the analog switch 43, these three types of two-phase signals are passed selectively. Example appropriate combinations of the first to the third resolvers 81 to 83 are shown below.

EXAMPLE 1

This example is a type for installing the function for detecting the rotor position of a PM motor and the function for detecting the absolute position. The first resolver 81 is a resolver having the same number (e.g., 20) of polar teeth as that of the PM motor, the second resolver 82 is a high resolution position detection resolver (e.g., 120 teeth), and the third resolver 83 is a unipolar resolver. With this combination, in addition to the effects obtained in example 1 of the first embodiment, the absolute angle position of the direct drive motor 10 can be detected.

EXAMPLE 2

This example is a type for correcting an absolute position detection error. The first resolver 81 is a unipolar resolver, the second resolver 82 is an 18-polar resolver, and the third resolver 83 is a 132-polar resolver. When the second resolver corrects an error in the absolute angle position obtained by the first resolver 81, the accuracy in the detection of the rotation angle position can be increased.

Fourth Embodiment

Figure 12:
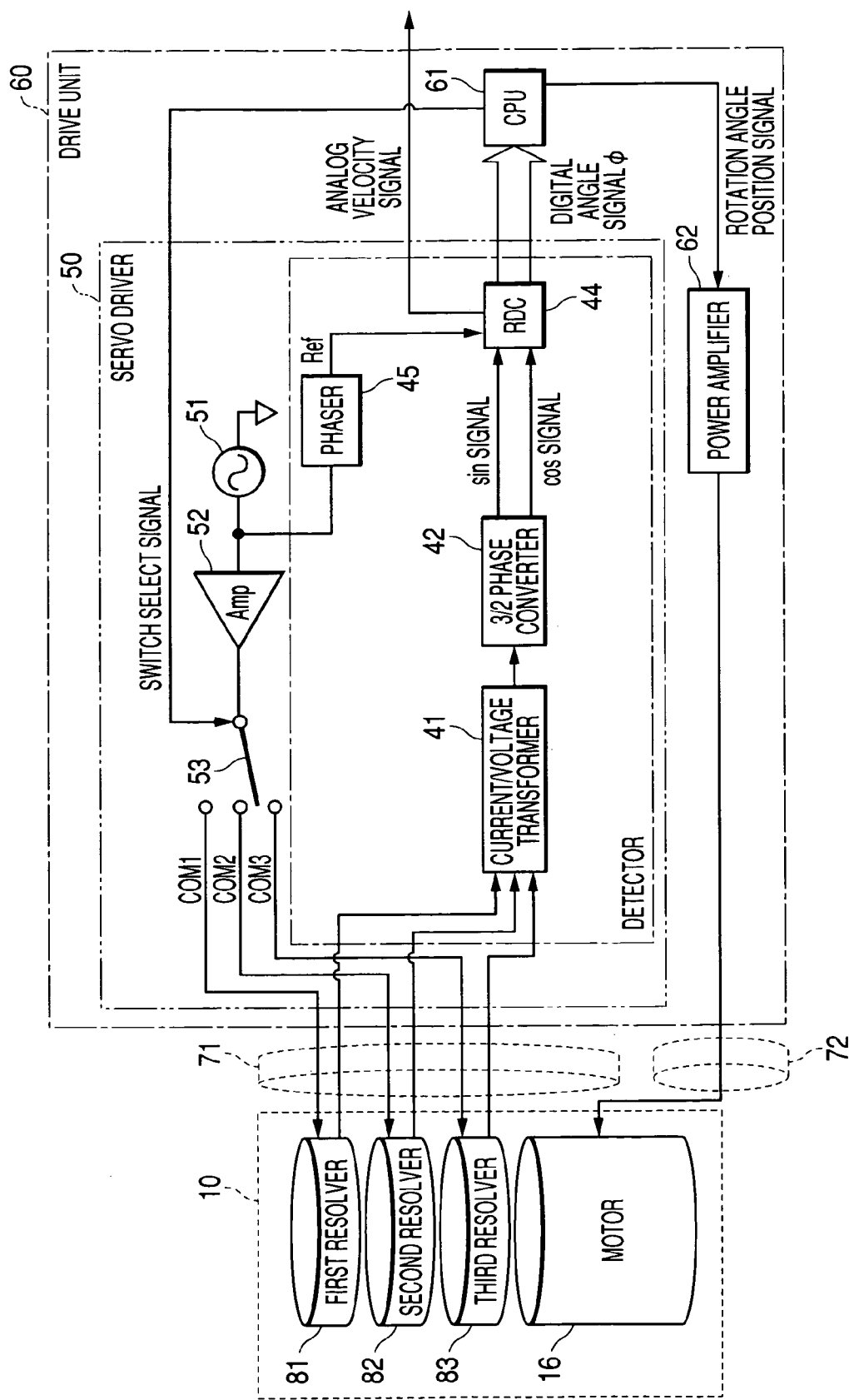
FIG. 12 is a block diagram showing the configuration of an angle position detection apparatus according to a fourth embodiment of the invention.

FIG. 12 is a block diagram showing the configuration of an angle position detection apparatus according to a fourth embodiment of the present invention. Since the basic configuration is the same as that of the third embodiment, the blocks denoted by the same reference numerals as those used in FIG. 11 are assumed to be corresponding blocks, and for them, no further detailed explanation will be given. As is shown in FIG. 12, a detector 40 includes not only a current voltage converter 41 and a 3/2 phase converter that are used in common, but also an RDC 44 and a phaser 45, as in the third embodiment. Compared with the third embodiment, the hardware structure is remarkably simplified.

An excitation signal is transmitted through a select switch 53 to a common terminal COM1, COM2 or COM3 to prevent at least two of the first to third resolvers 81 to 83 from being excited at the same time. Therefore, when the output current level is the same among the first to the third resolvers 81 to 83, current signals output by the resolvers 81 to 83 can be converted into resolver signals by the current/voltage transformer 41. The example combinations provided in the third embodiments can be employed for the first to the third resolvers 81 to 83.

According to the present invention, since a plurality of VR resolvers are not excited at the same time, the distance between the VR resolvers can be shortened, and the size and the thickness of the angle position detection apparatus can be reduced. Further, since magnetic flux leaking from one resolver does notmagnetically interfere with the other resolver, superior accuracy in the detection of positions can be obtained.

What is claimed is:

1. An angle position detection apparatus, for detecting the rotor position of a PM motor, comprising:
   a plurality of incorporated VR resolvers for changing reluctance in synchronization with the rotation of a rotary shaft;
   a resolver rotor fixed to the rotary shaft;
   a resolver stator opposite to the resolver rotor in a radial direction;
   stator poles protruding in a plurality of radial direction;
   a stator coil being supplied with an excitation signal and outputting an output signal;
   a transmitter for outputting an excitation signal;
   a switching unit for changing a supply path for the excitation signal so that the excitation signal output by the transmitter is transmitted to one of the alternately selected VR resolvers; and
   a detector for detecting an angle position for the rotary shaft based on a signal output by the VR resolver,
   wherein only one of the VR resolvers selected by the switching unit is excited,
   wherein
   the VR resolvers includes a first resolver and a second resolver,
   the first resolver includes the same number of polar teeth as that of the PM motor, and
   the second resolver is a high resolution position detection resolver.

2. The angle position detection apparatus according to claim 1, wherein
   the detector includes a single current/voltage transformer for converting a current signal output by each of the VR resolvers into a voltage signal.

3. The angle position detection apparatus according to claim 1, further comprising:
   coil bobbins made of flexible nonmagnetic material.

4. The angle position detection apparatus according to claim 1, said apparatus for detecting the absolute angle position of the rotary shaft, wherein
   the VR resolvers includes a first resolver and a second resolver,
   the first resolver is an (N+1) polar resolver, and
   the second resolver is an N-polar resolver (N is an integer of two or greater).

5. The angle position detection apparatus according to claim 1, said apparatus for detecting the absolute angle position of the rotary shaft within a predetermined angle range, wherein
   in order to detect the absolute angle position within an angle range of 360 degrees/M,
   the VR resolvers includes a first resolver and a second resolver,
   the first resolver is an M-pole resolver, and
   the second resolver is a resolver having a high resolution (M is an integer of two or greater).

6. The angle position detection apparatus according to claim 1, said apparatus for correcting an absolute position detection error, wherein
   the VR resolvers includes a first resolver, a second resolver and a third resolver,
   the first resolver is a unipolar resolver,
   the second resolver is an 18-polar resolver, and
   the third resolver is a 132-polar resolver.

7. An angle position detection apparatus, for detecting the rotor position of a PM motor and for detecting the absolute position, comprising:
   a plurality of incorporated VR resolvers for changing reluctance in synchronization with the rotation of a rotary shaft;
   a resolver rotor fixed to the rotary shaft;
   a resolver stator opposite to the resolver rotor in a radial direction;
   stator poles protruding in a plurality of radial direction;
   a stator coil being supplied with an excitation signal and outputting an output signal;
   a transmitter for outputting an excitation signal;
   a switching unit for changing a supply path for the excitation signal so that the excitation signal output by the transmitter is transmitted to one of the alternately selected VR resolvers; and
   a detector for detecting an angle position for the rotary shaft based on a signal output by the VR resolver,
   wherein only one of the VR resolvers selected by the switching unit is excited,
   wherein
   the VR resolvers includes a first resolver, a second resolver and a third resolver,
   the first resolver includes the same number of polar teeth as that of the PM motor,
   the second resolver is a high resolution position detection resolver, and
   the third resolver is a unipolar resolver.

8. The angle position detection apparatus according to claim 7, wherein
   the detector includes a single current/voltage transformer for converting a current signal output by each of the VR resolvers into a voltage signal.

9. The angle position detection apparatus according to claim 7, further comprising:
coil bobbins made of flexible nonmagnetic material.

10. The angle position detection apparatus according to claim 7, said apparatus for detecting the absolute angle position of the rotary shaft, wherein
the VR resolvers includes a first resolver and a second resolver,
the first resolver is an (N +1) polar resolver, and
the second resolver is an N-polar resolver (N is an integer of two or greater).

11. The angle position detection apparatus according to claim 7, said apparatus for detecting the absolute angle position of the rotary shaft within a predetermined angle range, wherein
in order to detect the absolute angle position within an angle range of 360 degrees/M,
the VR resolvers includes a first resolver and a second resolver,
the first resolver is an M-pole resolver, and
the second resolver is a resolver having a high resolution (M is an integer of two or greater).

12. The angle position detection apparatus according to claim 7, said apparatus for correcting an absolute position detection error, wherein
the VR resolvers includes a first resolver, a second resolver and a third resolver,
the first resolver is a unipolar resolver,
the second resolver is an 18-polar resolver, and
the third resolver is a 132-polar resolver.

* * * * *